Patented Oct. 2, 1934

1,975,471

UNITED STATES PATENT OFFICE 1,975,471

RESINOUS PRODUCT AND PROCESS OF MAKING SAME

Joseph V. Meigs, Dobbs Ferry, N. Y., assignor to Plastix Corporation, Wilmington, Del., a corporation of Delaware No Drawing. Application July 14, 1932, Serial No. 622,457

9 Claims. (Cl. 260—2)

This invention relates to artificial resins, especially to carbohydrate-phenol resins and intended for use in the manufacture of molded or pressed articles, impregnated substances or structures, or varnishes, or for other purposes for which products of this general type are used.

One of the objects of the invention is to provide resinous products possessing mechanical strength of a high order together with an increased resistance to water and improved electrical insulating properties under conditions involving the presence of water. Another object is to increase the speed with which such resins may be hardened or rendered infusible. These and other objects will be more fully hereinafter described.

In the preferred form of the present invention I use the primary resins, that is the resins at the soluble and fusible stage, made as described in my U. S. Patent No. 1,593,342, issued July 20, 1926, U. S. Patent No. 1,868,215, issued July 19, 1932; although I may use other resins, as for example, the primary resins described in U. S. Patent No. 1,845,314, issued February 16, 1932, U. S. Patent No. 1,832,038, issued November 17, 1931, U. S. Patent No. 1,801,052, issued April 14, 1931, or U. S. Patent No. 1,801,053, issued April 14, 1931; or fusible and soluble carbohydrate-phenol resins incorporating fatty acids or oils, as described in my U. S. Patent No. 1,868,216, issued July 19, 1932.

In carrying out the invention in its preferred form, I select a relatively brittle, fusible carbohydrate phenol resin and treat it with a suitable proportion of a reactive metallic basic body, as for example, five to twenty-five per cent by weight of calcium hydroxide and simultaneously with, or prior to or subsequent to this treatment I incorporate a sufficient proportion of hardening agent, preferably formaldehyde or derivative thereof, to enable such resin to become infusible and mechanically strong when heated. Supporting, extending or other material of a desirable character may be incorporated at any suitable stage of the process by various means known in the art. Such material may be fibrous, cellular, amorphous or crystalline in character.

The metallic basic bodies used in the present invention may be divided into two broad classes, viz., those freely soluble in water and those not freely soluble or insoluble. The former class includes the hydroxides of the alkali metals and the latter group embraces compounds of the alkaline earth metals, the earth metals and the so-called heavy metals. I may use, as examples of the latter group, the oxides or hydroxides of calcium, barium, aluminum, lead, zinc, tin, manganese, etc. I may, however, use any metallic compound which will be sufficiently reactive to bring about one or more of the improvements herein noted, although I prefer to use metallic compounds not freely soluble in water.

The invention in its preferred form may be practiced by reacting a fusible carbohydrate phenol resin with a difficultly water soluble metallic basic body and a formaldehyde derivative, as for example, hexamethylene tetramine. The mutual action of the methylene amine and the metallic compound produces surprising improvements, the resulting product possessing electrical insulating properties much superior, especially under conditions involving moisture, to those characteristic of the same resin acted on by the formaldehyde derivative in the absence of the metallic basic compound.

In a typical case, the insulation resistance of an infusible resinous product made by heating a mixture of carbohydrate phenol resin, wood flour and hexamethylene tetramine was increased approximately ten fold by including a substantial proportion of calcium hydroxide in the composition. In the instance referred to the value of the insulation resistance was measured after exposing the product to a humidity of 90 per cent for five days and therefore constitutes a measure of the ability of the resinous product to withstand the action of moisture. At the same time, the value of the product as a dielectric insulating medium, measured in terms of dielectric constant and phase angle difference, was improved more than one hundred per cent.

Hexamethylene tetramine is an efficient hardening agent for carbohydrate phenol resins in the sense that it yields under suitable conditions products possessing a high order of mechanical strength, but has the disadvantage that it also produces products which are more susceptible to water than is desired and which do not, particularly under conditions involving moisture, possess as high a degree of electrical insulating value as desired for some uses. This disadvantage of hexamethylene tetramine, when applied to carbohydrate phenol resins, is due, in my opinion, to the presence in such resins of organic acids, probably humic acids or derivatives thereof, which are capable of reacting with hexa, or the ammonia therefrom, to form water soluble or water decomposable products. The deleterious effect of ammonia on carbohydrate phenol resins is readily demonstrated by actual test as described in my copending application Serial No. 161,469 filed January 15, 1927, now U. S. Patent No. 1,923,321, issued Aug. 22, 1933.

I have, however, overcome this disadvantage by using a metallic compound in conjunction with hexa, and find that this combination imparts not only suitable mechanical strength but also electrical insulating value and water resistance of a high order.

A possible explanation of the benefits thus obtained is that those constituents of the resin which otherwise react with ammonia (or hexamethylene tetramine) may first react with the metallic base and thus become inert toward ammonia, or, the metallic base may liberate ammonia from its union with the resin. It is also possible that the water soluble or water-decomposable reaction products of the resin and ammonia (or hexamethylene tetramine) may form a water insoluble addition product of a physico-chemical character or a chemical character with the metallic base. Any of these or equivalent effects are to be understood as meant by the term derivative employed in the claims. My observations appear to indicate that electrical insulating value and water resistance are highest when the quantity of metallic base is at least approximately chemically equivalent to the ammonia capable of being yielded by the hexamethylene tetramine.

The advantages accruing to the use of a metallic compound in conjunction with a methylene amine as described may be noted by reference to the following table, which refers to molded compositions containing resin, wood flour and hardening agent. In one case hexa is used in conjunction with calcium hydroxide; in the other hexamethylene tetramine alone is used.

*Table*

| | No. 1 | No. 2 |
| --- | --- | --- |
| | Composition with hexamethylene tetramine and calcium hydroxide | Composition with hexamethylene tetramine and without calcium hydroxide |
| Insulation resistance | 319 to 525 megohms. | 40 megohms (or less). |
| Dielectric constant | 3.0 | 4.1. |
| Phase angle difference (at 1,000 cycles). | 2.0 degrees | 3.5 degrees. |
| Product of dielectric constant multiplied by phase angle difference. | 6.0 | 14.4. |
| Transverse breaking strength in pounds per square inch of cross section. | 10,600 | 9,000 to 10,000. |

It will be seen that the composition using calcium hydroxide is vastly superior in magnitude of insulation resistance to the composition without the metallic base. With respect to dielectric properties, since the product of phase angle difference times dielectric constant is an inverse measure of quality it is seen that the product containing the metallic base represents a big improvement in this matter. A certain increase in mechanical strength should also be noted.

A further effect of the metallic compound is the color of the hardened products. Those containing compounds of metals such as, for example, zinc, calcium, and the like, and a methylene amine are brown, whereas in the absence of such metallic base the color is much darker, usually black, although perhaps not quite jet. From my observations, this bleaching effect appears to be due to a mutual action of the reactive metallic compound, and the methylene amine, or ammonia, on the resin. This is an important discovery in view of the demand for molded or pressed products with colors other than black.

Still another advantage due to the combined use of a metallic compound and a hardening agent, particularly a methylene hardening agent, as applied to a carbohydrate phenol resin, is an increase in the rate of curing (hardening). The metallic compound appears to activate the methylene compound. This has been observed in particular in the case of hexa when used with lime.

The invention may be practiced in various ways. For example: (1) A fusible resin may be mixed with a metallic base, an aldehydic or methylene hardening agent such as the methylene amine, hexamethylene tetramine, and filling material, first in a ball mill and subsequently on heated rolls. (2) A solution of the resin in a solvent such as alcohol may be mixed with a hardening agent, metallic base and filling material and the solvent then evaporated or distilled. (3) The resin may be heated with a metallic base until the latter combines, in whole or in part, with the resin; and the resulting product then mixed with the hardening agent, and with the filling material, if used, either by the dry method, or by using a solvent. Other modifications will suggest themselves to those skilled in the resin art. Such procedures will yield compounds suitable for molding. The filling material is generally of a comminuted nature and often cellular or fibrous, such as wood flour, cotton flock, or other forms of cellulose.

Impregnated or coated paper or fabric is prepared by substantially the same method, the filling material being, however, in sheet form instead of in a comminuted condition. This difference necessitates a somewhat different technique in applying the resin to the filling material. It is possible to heat the resin with a suitable metallic compound, dissolve such product in a volatile solvent, together with the hardening agent, as for example hexa, and then use the resulting varnish as an impregnating or coating medium for application to paper or fabric. Equivalent results might be obtained by preparing a paper or fabric loaded with suitable proportions of metallic base, and then impregnating or coating such paper or fabric with a solution of resin containing an appropriate hardening agent.

For the preparation of molding material one may proceed in a typical case as follows:

*Example 1*

In a ball mill pulverize and grind together 1000 grams of a primary carbohydrate phenol resin, such as the primary or soluble and fusible resins described in Patent No. 1,593,342, together with 120 grams of calcium hydroxide and 150 grams of hexamethylene tetramine. To this mixture add 1400 grams of wood flour and continue grinding until the mixture is uniform and the wood flour particles are coated with the finely pulverized resin mixture. Pass the mixture in portions through differential rolls heated to 80 to 100 degrees centigrade, taking care to remove each portion from the rolls while it is still capable of readily flowing when subsequently molded. When all has been compacted and amalgamated by the hot rolls, disintegrate to a coarse or fine powder as desired and mold at a temperature of 150 to 180 degrees centigrade under pressure in the manner customary for hot molded or heat-set products.

I am not limited to the precise proportions of metallic compound indicated. The proportions specifically described herein are for illustrative purposes only. Some carbohydrate phenol resins may contain free sulphuric acid or other equivalent substance used as a converting agent in the reaction between carbohydrate and phenol, and in such case I use more than enough metallic compound to react with such acid converting agent. When the hardening agent is a methylene amine, I may, as already described, advantageously use sufficient metallic compound to be chemically equivalent to the ammonia or amine capable of being yielded by such hardening agent. Nor am I limited to any particular metallic compound. I have obtained good results by using the more difficultly water soluble metallic hydroxides or corresponding oxides, but I may use any metallic compound sufficiently basic or reactive to effect the improvements herein described. In some cases I can use the metallic salts of fatty acids.

I am aware of proposals to neutralize mineral acid catalysts in phenolic resins by bases including metallic bases and then to heat the product with a formaldehyde derivative, and wish to point out that my invention is quite different. In such procedures the mineral acid is converted into a metallic derivative but the organic resinous constituents are unaffected. My object is to have enough reactive basic compound to form a derivative with certain organic constituents of the resin and the methylene amine hardening agent. In my method, the neutralization of any mineral acid which may be present is merely incidental.

The condensation product of ammonia and formaldehyde known as hexamethylene tetramine is the hardening agent I prefer, but the invention is not restricted thereto, as I may use any other suitable hardener, such as trioxymethylene, condensation products of formaldehyde and aromatic amines, and other compounds, which in conjunction with a metallic base, act on carbohydrate phenol resins to produce products possessing mechanical strength of a high order coupled with superior resistance to water and improved electrical insulating properties, as herein described.

The property herein described as insulation resistance was determined in the following manner: The samples were 12.5 centimeters long, 1.3 centimeters wide and 1.3 centimeters thick. Brass strips wrapped with tinfoil were used as electrodes. Each electrode consisted of two strips between which the sample was clamped. Two such electrodes were placed on each sample 2.6 centimeters apart. The tinfoil along the edge of each electrode was pressed down against the surface of the sample with the dull edge of a knife in order to insure good contact with the surface. The samples were placed in a humidity chamber in which the relative humidity was kept constant at 90 per cent humidity by means of a sulphuric acid mixture of the proper specific gravity. At the end of five days, measurements of the electrical resistance between the electrodes on each sample were made. The results were reported in megohms and are the resistances in megohms between the two electrodes as described.

The term high insulation resistance is a relative one and refers to the improvements as herein described. The same thing is true of the term water resistant. The term mechanical strength of a high order refers to values for modulus of rupture or transverse breaking strength in the neighborhood of 8000 pounds per square inch or more.

I have found that glycerine may be used as hardening agent for carbohydrate phenol resins. I have reacted glycerine with such resins and thereby changed fusible resins to the infusible state. The following example may be cited as an illustration.

*Example 2*

A carbohydrate phenol resin of the type referred to as a primary resin in Example 1, was distilled until the temperature of the resin reached 230 degrees centigrade. Free phenol was evolved and condensed. To the residue, about 16 per cent by weight of glycerine on the weight of the primary resin was added and distillation continued, the temperature of the mass rising from 214 to 260 degrees centigrade during about two and one half hours. At the end of this time the resin became infusible and resilient.

Calcium hydroxide, or other equivalent, may be incorporated in the above composition in the same manner set forth in Example 1 and with similar beneficial results. Likewise, in some cases it is found desirable to employ in addition to the glycerine varying amounts of methylene hardening agents such as hexamethylene tetramine.

The slow rate of hardening noted in Example 2 suggests the application of this reaction in the production of resinous products that are molded and subsequently baked to harden, i. e. in the cold molding art. In such application, the glycerine or equivalent will act as a flux for the molding operation and as a hardening agent in the subsequent baking. As is well known in the cold molding art, the molding mixtures should be plastic during molding and it is desirable that plasticizing agents combine chemically during the subsequent baking. It would appear that glycerine may perform these functions.

While my invention in its preferred form involves the use of a metallic base in conjunction with a methylene hardening agent, I may in some cases, especially with resinous products the properties of which do not require the use of such hardening agent, dispense with the employment of the same. The following example is an illustration. In this example aniline with hydrochloric acid is used as a converting agent and it is to be understood that other converting agents may be employed as for example sulphuric acid.

*Example 3*

A reaction mixture consisting of Argo corn sugar (crude dextrose) 420 grams, meta-para cresol 180 ccm., water 100 cubic centimeters, aniline 30 cubic centimeters, and concentrated hydrochloric acid 8 cubic centimeters was boiled under a reflux condenser for five hours, the reflux condenser being cooled by a flow of cool water at ordinary temperature. An aqueous solution and a resinous product were formed. The latter was removed and washed with hot water. 15 grams of lead dioxide were incorporated with the washed resinous product, without dehydrating the latter, and the resulting mass heated. At about 140 degrees F. there was a sudden coagulation. Water separated and a tough rubbery mass was produced.

This application is a continuation in part of my copending application Ser. No. 232,459 filed November 10, 1927.

What I claim is:

1. The process of making a resinous substance which comprises heating a primary carbohydrate phenol resin to approximately 230° C., adding approximately 16% by weight of glycerine on the weight of the primary resin, and continuing the application of heat until the substance becomes substantially infusible.

2. In the manufacture of carbohydrate phenol resins the use of glycerine as a hardening agent.

3. The reaction product of a carbohydrate phenol resin, glycerine and a compound of the group consisting of alkaline reacting oxides and hydroxides of metals.

4. The reaction product of a carbohydrate phenol resin, glycerine and an alkaline reacting metallic hydroxide.

5. The reaction product of a carbohydrate phenol resin, glycerine and an alkaline reacting hydroxide of a metal of the alkaline earth metal group.

6. The reaction product of a carbohydrate phenol resin, glycerine and calcium hydroxide.

7. The reaction product of a carbohydrate phenol resin, glycerine, a methylene hardening agent and a compound of the group consisting of oxides and hydroxides of metals.

8. The reaction product of a carbohydrate phenol resin, glycerine, a methylene amine hardening agent and a compound of the group consisting of alkaline reacting oxides and hydroxides of metals.

9. The reaction product of a carbohydrate phenol resin, glycerine, hexamethylene tetramine and a compound of the group consisting of alkaline reacting oxides and hydroxides of metals.

JOSEPH V. MEIGS.